US006996777B2

(12) United States Patent
Hiipakka

(10) Patent No.: US 6,996,777 B2
(45) Date of Patent: Feb. 7, 2006

(54) METHOD AND APPARATUS FOR PRESENTING AUDITORY ICONS IN A MOBILE TERMINAL

(75) Inventor: Jarmo Antero Hiipakka, Espoo (FI)

(73) Assignee: Nokia Corporation, Espoo (FI)

( * ) Notice: Subject to any disclaimer, the term of this patent is extended or adjusted under 35 U.S.C. 154(b) by 499 days.

(21) Appl. No.: 09/995,649

(22) Filed: Nov. 29, 2001

(65) Prior Publication Data

US 2003/0098892 A1    May 29, 2003

(51) Int. Cl.
    *G06F 3/00*    (2006.01)
(52) U.S. Cl. ............ 715/727; 715/866; 715/745; 715/864; 340/384.5; 340/825.25
(58) Field of Classification Search ........... 345/727, 345/729, 864, 865, 744, 745, 747, 866, 811, 345/812, 733, 748, 765; 340/384.1, 384.7, 340/384.5, 321, 328, 825.25, 825.19, 825.36, 340/825.44
See application file for complete search history.

(56) References Cited

U.S. PATENT DOCUMENTS

| | | | | |
|---|---|---|---|---|
| 5,287,102 A | * | 2/1994 | McKiel, Jr. ............ 340/825.19 |
| 5,508,699 A | * | 4/1996 | Silverman .......... 340/825.19 X |
| 5,533,182 A | * | 7/1996 | Bates et al. ................. 345/727 |
| 5,797,125 A | * | 8/1998 | Hirohama .......... 340/825.25 X |
| 5,943,399 A | | 8/1999 | Bannister et al. ........ 379/88.17 |
| 5,950,130 A | | 9/1999 | Coursey ..................... 455/432 |
| 6,020,881 A | | 2/2000 | Naughton et al. .......... 345/327 |
| 6,047,197 A | | 4/2000 | Jarrad ........................ 455/566 |
| 6,195,004 B1 | * | 2/2001 | Leonowich ........ 340/825.19 X |
| 6,362,841 B1 | | 3/2002 | Nykanen ..................... 345/835 |
| 6,384,850 B1 | | 5/2002 | McNally et al. ............. 345/810 |
| 6,404,442 B1 | * | 6/2002 | Hilpert et al. ............... 345/727 |
| 6,466,236 B1 | | 10/2002 | Pivowar et al. ............. 345/835 |
| 6,668,177 B2 | | 12/2003 | Salmimaa et al. .......... 455/566 |
| 6,760,754 B1 | * | 7/2004 | Isaacs et al. ................ 345/727 |
| 2001/0047384 A1 | * | 11/2001 | Croy ...................... 345/727 X |

FOREIGN PATENT DOCUMENTS

| | | |
|---|---|---|
| WO | WO99/21164 | 4/1999 |
| WO | WO99/49453 | 9/1999 |
| WO | WO 00/65429 | 11/2000 |

OTHER PUBLICATIONS

"Methodology for Audible Announcement of Distinguishing between Interface Objects of the Same Type and Class to Visually Impaired Users", IBM Technical Disclosure Bulletin, Sep. 1993, vol. 36, No. 9B, pp. 459-460.*

"Audio User Interface System", IBM Technical Disclosure Bulletin, Mar. 1996, vol. 39, No. 3, pp. 83-84.*

* cited by examiner

*Primary Examiner*—Raymond J. Bayerl
(74) *Attorney, Agent, or Firm*—Banner & Witcoff, Ltd.

(57)    ABSTRACT

An apparatus and method for presenting one or more auditory icons are provided to deliver contextual information in a timely manner to the user without requiring the user to view the mobile terminal's display. The auditory icons may correspond to visual icons that are provided on a display of the mobile terminal, for example, a navigational bar. The mobile terminal receives a plurality of messages from one or more message sources, prioritizes them according to one or more context values, and presents to the user auditory icons associated with the messages in accordance with any number of pre-set preferences set by the user.

42 Claims, 12 Drawing Sheets

USER A PROFILE

| PRIORITY | CONTEXT VALUE |
|---|---|
| 1 | Proximity |
| 2 | Type of establishment (food, retail, movies, transp.) |
| 3 | Availability of services (vacancy/crowdedness) |
| 4 | Friends |
| 5 | Price |
| 6 | Grade of service (five star, four star, three star) |
| | |

FIG. 7

USER B PROFILE

| PRIORITY | CONTEXT VALUE |
|---|---|
| 1 | Friends |
| 2 | Price |
| 3 | Proximity |
| | |

FIG. 8

USER C PROFILE

| PRIORITY | CONTEXT VALUE |
|---|---|
| 1 | TIME-OF-DAY (11am-1pm): Food |
| 2 | Proximity |
| 3 | TIME-OF-DAY (6pm-8pm): Food |
| 4 | Price |
|  |  |

FIG. 9

| MATCH RANKING | PROXIMITY | PRICE | ENTITY OR SERVICE |
|---|---|---|---|
| 1 | 0.1 | $3 | McDonald's |
| 2 | 0.1 | $5 | Pizza Hut |
| 2 | 0.1 | $5 | Starbucks |
| 3 | 0.2 | $2 | Subway Station |
| 4 | 0.3 | $2 | Bus Terminal |
| 5 | 0.4 | NA | Shoe Store |
| 6 | 0.5 | NA | Sears |
| 7 | 0.6 | $79 | Holiday Inn |
| 8 | 0.6 | $89 | Hyatt Hotel |
| 8 | 0.6 | $89 | Hilton Hotel |
| 9 | NA | NA | yahoo.com |
|  |  |  |  |

FIG. 10

METHOD AND APPARATUS FOR PRESENTING AUDITORY ICONS IN A MOBILE TERMINAL

FIELD OF THE INVENTION

The invention relates to the presentment of information in audible form for mobile terminals, such as cellular telephones, personal digital assistants (PDAs), and similar devices. More particularly, the invention provides a method and apparatus for presenting auditory icons.

BACKGROUND OF THE INVENTION

Modern computer operating systems generally use pictures, such as icons, to represent application programs and documents on computer displays. The well-known MAC OS operating system from Apple Computer Corporation and the WINDOWS operating system from Microsoft Corporation are two examples of widely used graphics-oriented operating systems.

More recently, mobile terminals such as cellular telephones and wireless-enabled PDAs have incorporated graphics-oriented technology that allows a user to select application programs, web sites, and documents. Following increases in computing performance and memory capacity, mobile terminals now host an increasing number of application programs and capabilities. The Nokia 9210 COMMUNICATOR, for example, supports numerous functions such as telephone, fax, e-mail, calendar, and contacts features.

In order to maintain a convenient handheld form factor, the graphics displays for mobile terminals are necessarily small, thus limiting the amount of information that can be comfortably viewed at one time. Consequently, one problem confronting designers of such devices is determining how to maximize the number of icons and other graphical symbols on the display of such devices without making the symbols too small to see.

For example, U.S. Pat. No. 6,047,197, entitled "Icon Driven Phone Menu System," describes a cellular telephone including a display mode selector that allows a user to select one of two display modes. Although the display modes in the aforementioned patent allow a user to navigate through numerous icons on the display, each icon takes up roughly the same amount of space on the display, regardless of its importance to the particular user. For example, if one user predominantly uses application programs A and B, whereas a second user predominantly uses application programs C and D, each user must navigate through the same set of icons in order to locate his or her desired application programs. Although it is possible for two users to customize their mobile terminals to delete certain applications that are rarely used, it may be undesirable to do so. Moreover, some users may want the ability to access an application program or other object (e.g., a document) even if it is only rarely needed. Consequently, there remains the problem of providing a display of icons that is specific to a particular user's needs.

Another limitation with providing icon information on displays of mobile terminals is that it requires the user to read the information on the mobile terminal's display. As the mobile terminal receives new contextual information, the user may not become aware of this information. The mobile terminal typically receives new contextual information as the user moves from one area to another. A user on the move, however, is not always able to look at his/her mobile terminal. For example, the user may not wish to look at the mobile terminal while he/she is driving a vehicle. As another example, the user will not know to look at the mobile terminal if it is out of sight or in his/her pocket. As still another example, the user may be impaired vision. Accordingly, unless he/she actually reads the mobile terminal display, the user may not learn of certain information on a timely basis.

Therefore, there exists a need in the art for systems and methods that provides contextual information in a timely manner and without requiring the user to actually view the mobile terminal.

SUMMARY OF THE INVENTION

The above-mentioned needs in the art are satisfied by the disclosed systems and methods that audibly present context-dependent information to the user. Audible icons can be used to deliver contextual information in a timely manner to the user without requiring the user to view the mobile terminal's display. Although not required, the audible icons may correspond to visual icons that are provided on a display of the mobile terminal, for example, a navigational bar. Such visual icons, may for example, be presented in varying sizes, shapes, and colors, and prominence to allow the user to quickly identify icons that are likely to be used at any given time.

In one embodiment of the invention, a method of providing an audio user interface for a mobile terminal is disclosed. The method includes receiving a plurality of messages from one or more message sources. These messages are prioritized to identify at least one best match message based on one or more context values. Once one or more best match messages are identified, auditory icons associated with the best match messages are presented to the user.

In other embodiments of the invention, one or more auditory icons may be presented when the corresponding visual icons are displayed on the mobile terminal display or when a user selects once of the visual icons in the display.

In still other embodiments of the invention, a mobile device is provided that is capable of displaying a plurality of prioritized user-selectable icons. The mobile device has a sound generator providing an audio icon associated with one or more of the plurality of priorizited user-selectable icons.

In other embodiments of the invention, computer-executable instructions for implementing the disclosed methods are stored on computer-readable media.

BRIEF DESCRIPTION OF THE DRAWINGS

FIG. 7 shows an example of a priority-ordered list of context values contained in a first user's profile.

FIG. 8 shows an example of a priority-ordered list of context values contained in a second user's profile.

FIG. 9 shows an example of a priority-ordered list of context values contained in a third user's profile.

FIG. 10 shows an example of a memory storage area containing a plurality of records ranked first according to proximity and secondarily according to price.

DETAILED DESCRIPTION OF THE INVENTION

Figure 1:
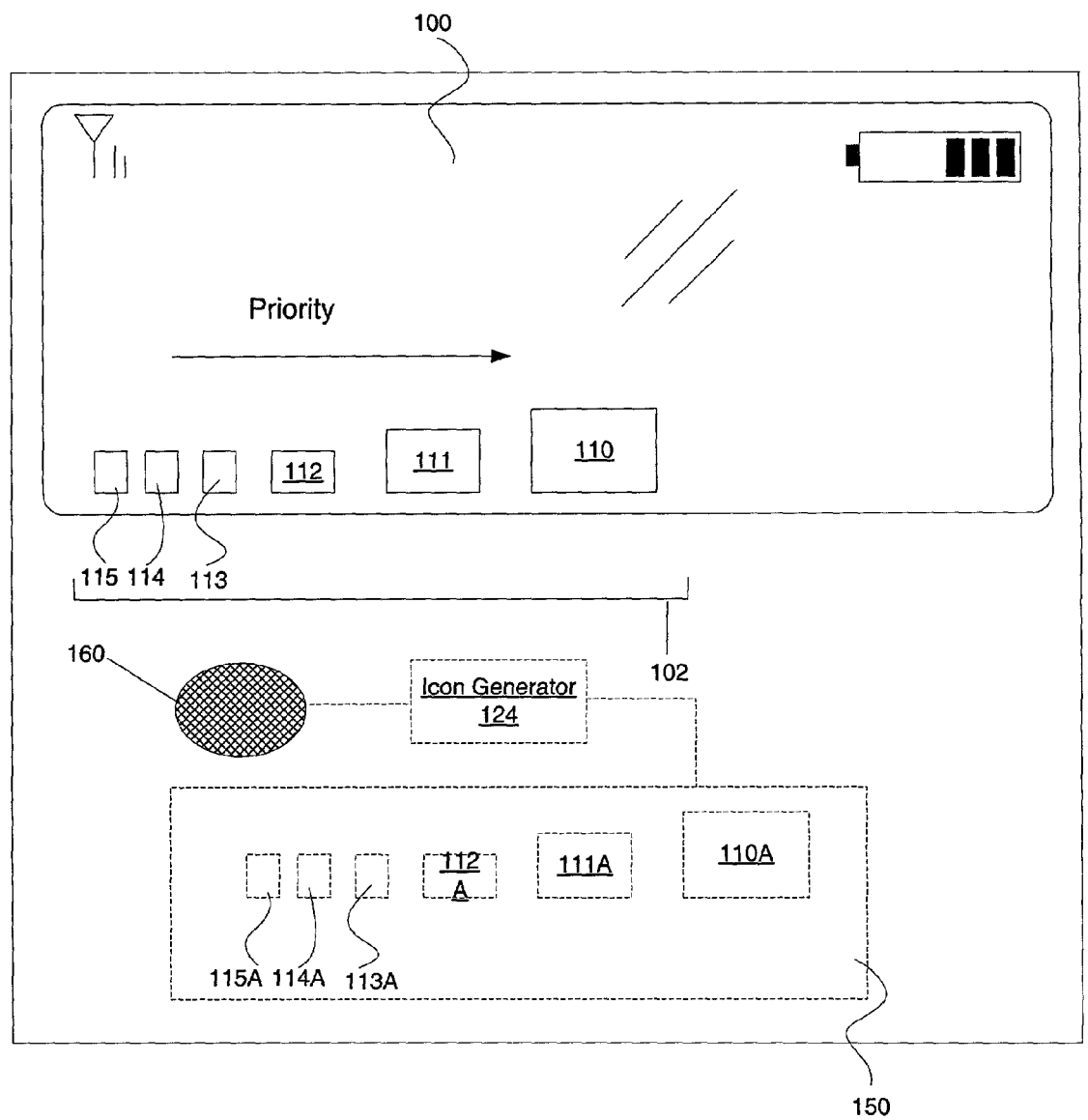
FIG. 1 shows a mobile terminal having auditory icon presentment and visual icon display capabilities in accordance with an embodiment of the invention.

FIG. 1 shows a mobile terminal display 100 having visual icons 110–115 and auditory icons 110A–115A in accordance with an embodiment of the invention. Each auditory icon 110A–115A may be stored in icon storage 150 and may correspond to a visual icon 110–115. The mobile terminal may comprise a Nokia 9210 COMMUNICATOR, a cellular telephone, portable computer, or any other mobile electronic device having a display. Each visual icon and corresponding auditory icon pair represent a particular contextual message received by the mobile terminal. An auditory icon is generally an audible message, a sound, and/or a series of sounds providing information about its associated message that the mobile terminal can play for the user. The auditory icon thereby audibly presents contextual information in a timely manner to the user without requiring the user to actually view the mobile terminal's display 100. Each visual icon 110–115 is generally a glyph or textual object presented on the mobile terminal display 100. Visual icons 110–115 and the corresponding auditory icons 110A–115A may be loaded at the time the corresponding contextual message is received, and/or may be pre-loaded in the mobile terminal and customizable by the user. In another embodiment of the invention, a mobile terminal may be used that only presents auditory icons. In this embodiment, the mobile terminal would not utilize a visual display or would not present visual icons.

In one embodiment, the mobile terminal presents one or more auditory icons 110A–115A to the user by way of a sound generator 124 and one or more speakers 160. The mobile terminal may present auditory icons in any number of circumstances. In one embodiment, auditory icons 110A–115A may be presented to the user in order of priority of the messages associated with each auditory icon that matches one or more context values (discussed further herein). For example, if the context value is proximity of the message to the mobile terminal, auditory icon 120A corresponding to visual icon 120 (which corresponds to the message whose source is the closest to the user of the mobile terminal) is presented first to the user with the other auditory icons 121A–125A presented in decreasing order of proximity. In another embodiment, only the best auditory icon in terms of priority may be presented to the user. In yet another embodiment, auditory icons may be presented when there is a change in the display of visual icons 110–115. For example, auditory icons may be presented for the corresponding visual icons that are added and/or removed from the proximity and/or priority bars. To avoid continuous disturbing playing of auditory icons resulting from small changes, there may be a need to set a limit for the importance the change must have before an auditory icon is presented.

In still another embodiment, mobile terminal may present an auditory icon 110A–115A when the user selects the corresponding visual icon 110–115 by moving a pointer or magnifying glass over the visual icon. Where the user selects a visual icon, the corresponding auditory icon may be presented and/or a message may be presented in text form and/or audio form by using text-to-speech (TTS) synthesis or by streaming additional descriptive audio.

In addition to the circumstances under which they are presented, auditory icon 110A–115A may be varied in any number of ways. The substantive content of the auditory content may vary depending on the application. For example, auditory icon 110A–115A may be unique to its corresponding contextual message. For example, a message from a particular restaurant may have a unique auditory icon that presents the specials of the day. Alternatively, auditory icon 110A–115A may be descriptive of the general category of the corresponding contextual message. As such, auditory icon 110A–115A may be, for example, a restaurant icon, a public transportation icon, etc. A restaurant auditory icon could be presented, for example, any time a visual icon representing a message from a restaurant is displayed. In addition, the auditory icon may have varying forms and formats depending upon the presentment preferences of the user. For example, the message may be presented in auditory icon form by using text-to-speech (TTS) synthesis or by streaming additional descriptive audio information about the message.

In addition, the sound quality of the auditory icon 110A–115A may vary and may include, for example, monophonic or stereophonic formats. In one embodiment, auditory icons 110A–115A may be implemented with monophonic sounds to allow for spatial audio processing and reproduction techniques for conveying additional information to the user. Such additional information may include information regarding the spatial position of the associated message relative to the user or other spatial qualities. Any number of known or future-developed spatial audio reproduction techniques may be implemented depending in part on the application including, but not limited to, stereo amplitude panning, positional audio with acoustics modeling, and auralization with head-related transfer functions (HRTF). Where spatial audio techniques are implemented, the corresponding visual icons may be oriented in a horizontal fashion relative to the ground to provide spatial orientation to a user. Other spatial qualities that can be conveyed by auditory icons 110A–115A including, for example, using attenuation and artificial reverberation to make less important messages appear more distant. Spatial audio techniques may also be used to indicate the visual icon's position on the display. The user may thereby more readily focus in on the relevant icons in the display corresponding to the auditory icon.

According to one aspect of the invention, auditory icons and, optionally, visual icons corresponding to messages received by the terminal are ranked according to one or more context values and presented in an order that indicates the degree of matching between characteristics associated with the message and one or more of the context values. As discussed herein, a context matcher function may be utilized to produce a ranked ordering of messages based on the one or more context values. Context values are generally one or more parameters from which to assess a relevance of a message to the user. Context values, for example, may be specific to the characteristics of the mobile terminal or the user's preferences. For example, context value may include type of establishment (e.g., hotel, retail, movies, transportation); availability of services (e.g., less crowded or high vacancy establishments); friends (i.e., preference for indicating presence of other mobile units corresponding to known persons); time-of-day (e.g., preferences for certain types of services during certain time periods); and grade of service (e.g., four-star restaurants and hotels preferred over three-star establishments). Many other variations are of course possible.

In certain embodiments, context values may be identical for a group of mobile terminal users. In other embodiments, users can individually specify, prioritize, and modify context values. It is also of course possible to provide default context values that can be changed by a user.

Another example of a context value is geographic location or a proximity value that provides a distance between the source of the message associated with an icon and the mobile terminal. As a mobile terminal moves around a geographic area, the terminal may receive messages from retail stores, restaurants, movie theaters, public transportation terminals, Web sites, and other entities. The messages can be provided the mobile terminal; the value can be based on the terminal's location within a predetermined geographic area (for example, the area served by a particular cell phone tower), or on other factors (e.g., the identity of the mobile user, other demographic factors, or the precise geographic location of the mobile terminal.). The proximities of the sources of the received messages may be used to present auditory icons with the closest sources first. In addition, visual icons may be positioned and sized in decreasing order of proximity on the navigation bar. Proximity can be derived by the mobile terminal based on a comparison of the terminal's specific location with the location of the source of the message, or it could be provided directly by the entity if the entity is able to discern the location of the mobile terminal. The location of the mobile terminal may be determined by a variety of conventional methods and devices such as identifying a cell phone tower or using a global positioning system.

Prioritizing messages (and their corresponding visual and auditory icons) according to proximity as a context value organizes the information in a manner that is meaningful to the user. Suppose that a mobile terminal user is in a geographic area that includes several restaurants, hotels, retail stores, bus terminals, and other entities. Suppose further that each of these entities transmits a message to mobile terminals in the area describing their services (including, in some variations, an icon depicting a corporate logo), their location, their availability, prices, and other information. Each of these entities could potentially try to solicit business from a particular mobile user, thereby inundating the user with commercial messages. According to one variation of the invention, icons corresponding to messages received from each entity are filtered and arranged according to the degree of proximity to the mobile terminal, such that auditory icons for the entities that are closest to the mobile terminal are presented first. Similarly, visual icons for the entities that are closer to the mobile terminal are more prominently displayed than are entities that are further away from the mobile terminal. (Proximity can be derived by the mobile terminal based on a comparison of the terminal's specific location with the location of a particular entity, or it could be provided directly by the entity if the entity is able to discern the location of the mobile terminal). Other criteria (e.g., price, time of day, etc.) can also be used to filter and present the icons corresponding to such entities and messages.

For example, suppose that the user of the mobile terminal of FIG. 1 has indicated that the most important criterion for presenting icons is proximity to service. Accordingly, those entities having the closest proximity to the mobile terminal have their auditory icons presented first. In addition, their corresponding visual icons are presented on the mobile terminal display using icons having a larger display format than other visual icons on the display. As shown in FIG. 1, visual icon 110 is represented in the largest display footprint, indicating that the associated message has the best match to one or more context values in relation to services corresponding to the other visual icons 111–115 on the display 100. Other entities that are farther away from the mobile terminal are represented using a smaller icon size.

A second mobile user may have indicated that price is of paramount importance, all other values being equal. If four different hotels transmit messages to the mobile terminal of the second mobile user and include pricing information (e.g., rate per night), the hotels would have their auditory icons presented according to lowest price. In addition, their visual icons may be represented on the second mobile user's display using a display size that comports with their relative prices. Consequently, even if two different mobile terminals are operating in the same geographic area, it is possible to tailor the auditory icons and, optionally, the visual icons to best match each user's preferences.

As discussed herein, although not required, the user may establish his/her preferences on the various options for presenting auditory or visual icons including how and under what circumstances they are presented or displayed as well as the context values that could be used to prioritize the auditory or visual icons.

As will auditory icons, visual icons may be arranged and displayed in any number of ways. Referring still to FIG. 1, visual icons 110–115 form a navigation bar 102. In the exemplary embodiment of FIG. 1, and although not required, navigation bar 102 includes visual icons having different dimensions, wherein the dimensions generally correspond to the degree to which messages associated with each visual icon match one or more context values. Other visually discernible differences in visual icon display characteristics can be used to signify differences in matched values and proximity, such as different widths; different heights; colors; intensities; shapes; or the like. The size of the visual icons may also be based on a stratified matching approach, such that visual icons falling within a certain match range are assigned a first size, and visual icons falling within the next match range are assigned a second size that is smaller than the first size. Visual icons can also be presented in a circular, spiral, or other two-dimensional pattern radiating outward from a center point, such that visual icons in the center area are larger (or more prominent) than visual icons that radiate outwardly from the center. Other arrangements are of course possible, including a two-dimensional arrangement (e.g., a circle or a square arrangement of icons). Moreover, a user-specified position can be designated for the "best match" icons. Finally, although the icons are shown in the figures as having a gradually decreasing icon width corresponding to lower match values, icon sizes can of course be assigned based on a stratified matching approach, such that icons falling within a certain match range are assigned a first size, and icons falling within the next match range are assigned a second size that is smaller than the first size.

Figure 2:
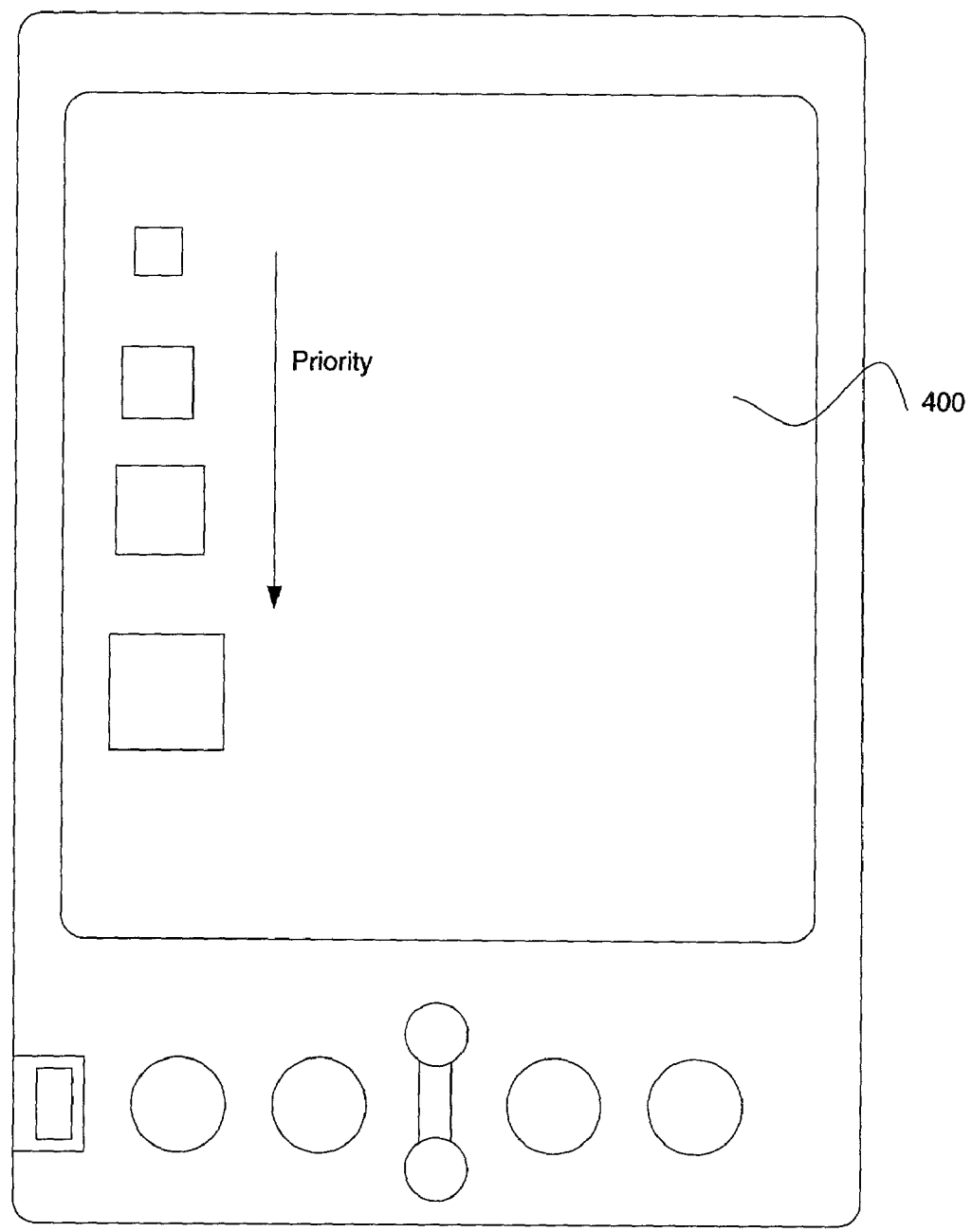
FIG. 2 shows a vertical navigation bar for displaying visual icons similar to the arrangement shown in FIG. 1.
Figure 3:
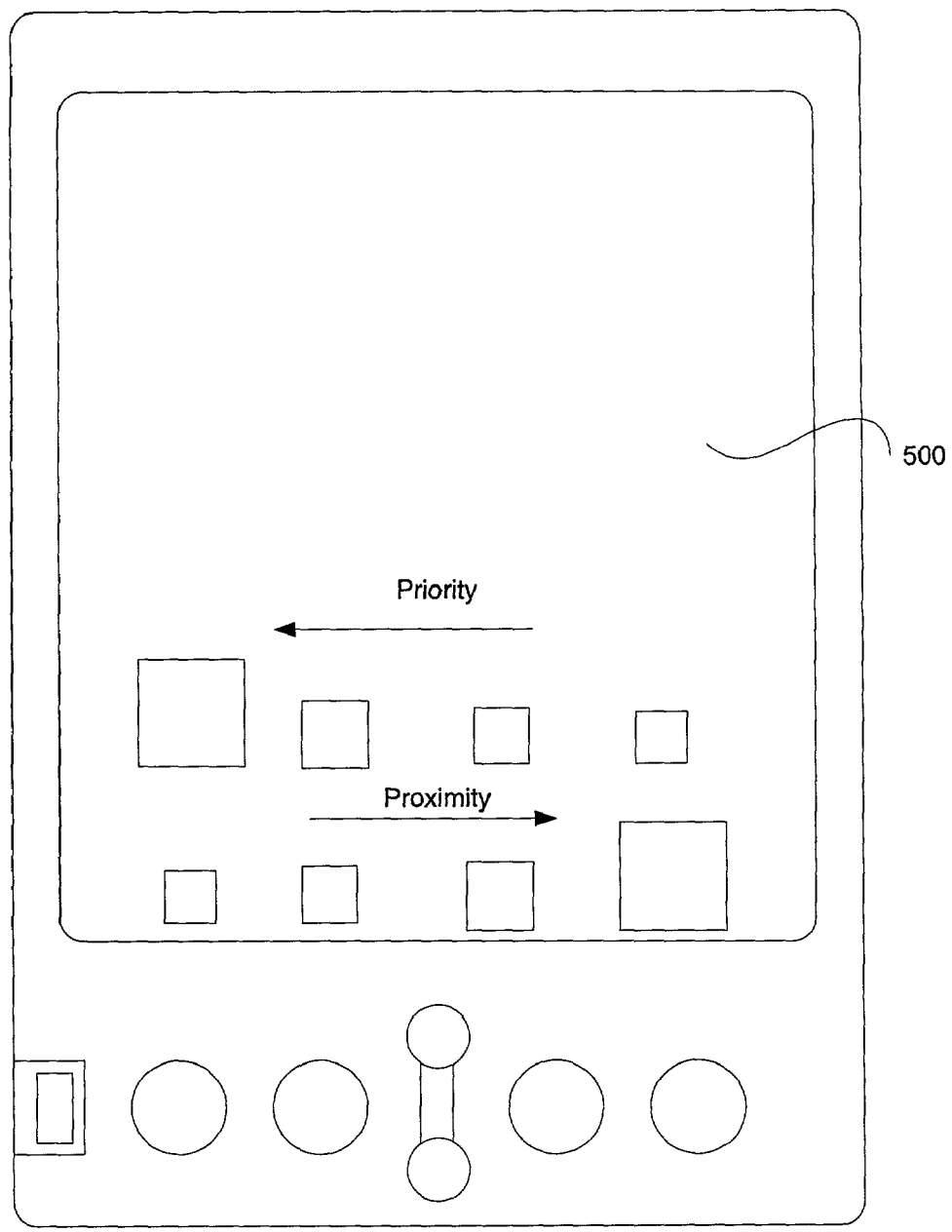
FIG. 3 shows the use of a plurality of navigation bars for displaying visual icons.

As discussed, embodiments of the present invention include devices that only present auditory icons and that do not utilize a visual display or that do not present visual icons. In the embodiments, where a visual display is utilized to display visual icons, however, the visual icons can be arranged in a diagonal, vertical, horizontal, or other type of arrangement. For example, FIG. 2 shows a vertical context bar, similar to the arrangement shown in FIG. 1, but with the visual icons arranged in a navigation bar along a vertical edge of a display screen. The mobile terminal may have a greater number of navigation bars depending upon the complexity of the service provided, the capabilities of the mobile terminal, and/or the user's preferences. For example, FIG. 3 illustrates a display 300 in which two navigation bars, e.g., a priority bar and a proximity bar, are formed horizontally in different rows.

Each visual icon may comprise a corporate logo or other graphic symbol corresponding to an application program, a hyperlink to a Web page, an informational message, a document, a prepopulated e-mail inquiry, or any of various other types of objects. The user of the mobile terminal can select any object using a conventional keypad, cursor button, stylus, or the like. In one embodiment, an icon selector, such as a magnifying glass metaphor, can be used to highlight and select a desired icon. By moving the magnifying glass over an icon, a text message explaining or identifying the selected icon can be displayed at the bottom of the screen. In addition, the corresponding auditory icon can be presented when the user selects a visual icon. In one variation, the magnifying glass, when moved over an icon that has a small size in relation to other icons, temporarily magnifies the icon to an enlarged size, thus facilitating the viewing of small or hard-to-read icons. Moreover, the context bar can be selectively activated or hidden according to a user's choice. It will be appreciated that other types of icon selectors can be used without departing from the principles of the invention.

Figure 4:
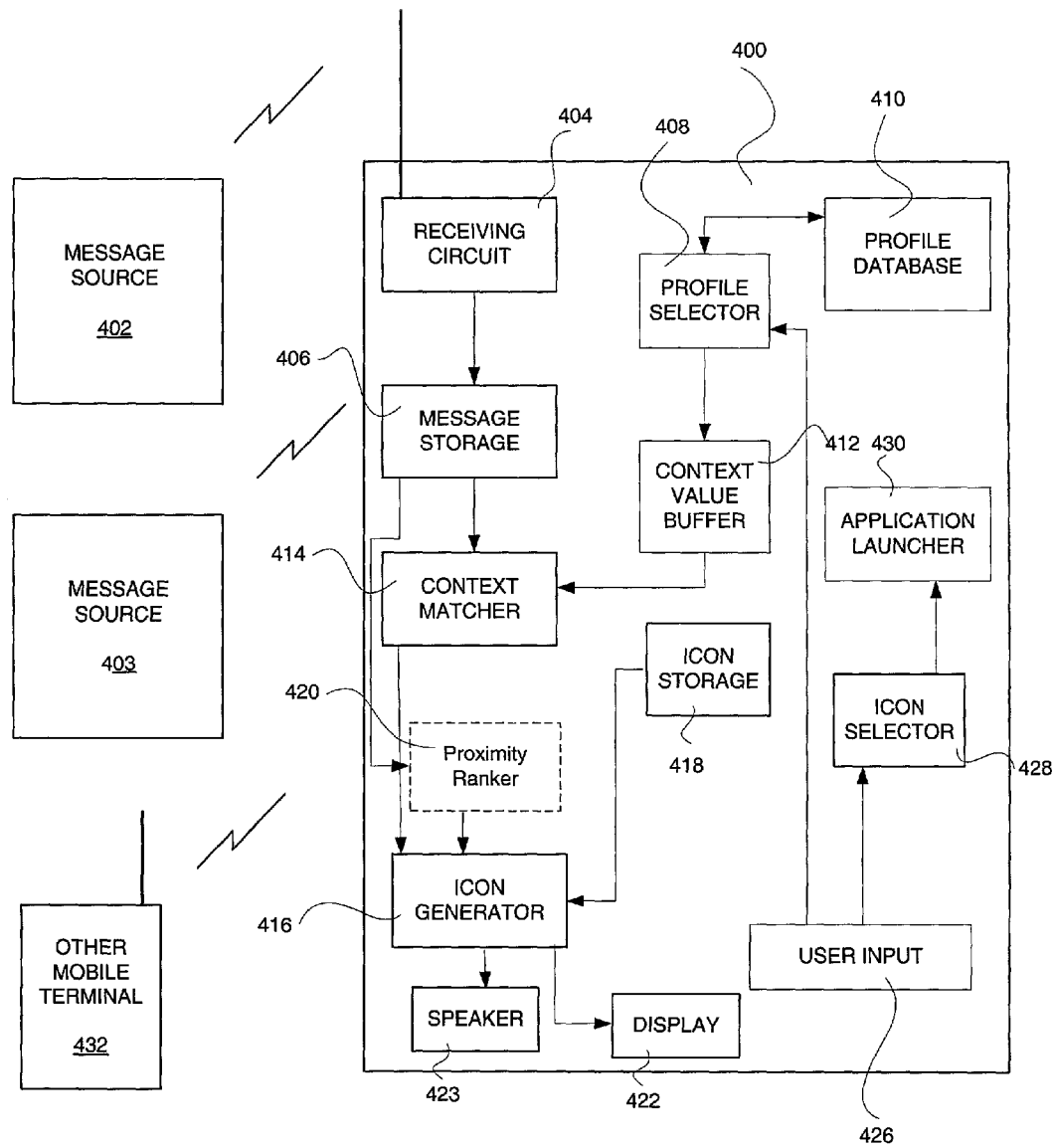
FIG. 4 is a schematic block diagram of a mobile terminal configured in accordance with various principles of the invention.

FIG. 4 shows a mobile terminal 400 configured in accordance with various principles of the invention. Although not explicitly shown in FIG. 4, the mobile terminal may include a microprocessor or other computing device and memory for storing computer-executable instructions. Although not required, part of the invention will be described in part in the general context of computer-executable instructions, such as program modules. Generally, program modules include routines, programs, objects, scripts, components, data structures, etc. that perform particular tasks or implement particular abstract data types. Program modules may be part of a single software program, may be implemented as separate software programs, or may be part of hardwired devices having various electronic components for carrying out the desired functionality.

As shown in FIG. 4, mobile terminal 400 communicates with a message source 402 and a message source 403 through a receiving circuit 404. In one embodiment, message sources 402 and 403 communicate with mobile terminal 400 in a wireless manner (e.g., radio frequency, optical, or other communication means). Message sources 402 and 403 may include such entities as: restaurants, travel agencies, hotels, Web sites or any other entities able to communicate with mobile terminal 400. Two message sources are shown for illustrative purposes only with the understanding that several additional message sources may transmit messages to mobile terminal 400.

Messages that are transmitted by message sources 402 and 403 may include information such as the geographic location of an establishment; proximity of the establishment to a particular mobile user or other geographic location; price information; corporate logos; pictographic icons; hyperlinks to Web pages; advertisements (including audio, video, or text); entertainment services (e.g., music, videos, and the like); indicators identifying grades of service (e.g., AAA ratings, hotel "star" ratings, restaurant rankings, and the like); availability of services (e.g., indicating whether a hotel has vacancies; that a particular restaurant is crowded; or the average waiting time for service at a particular restaurant); personal e-mails from friends or family, or any other type of characteristics that can be matched to context values.

Messages are received by receiving circuit 404 and stored in a message storage area 406. Messages may be time-stamped and expire or be deleted after a certain period of time. In embodiments that allow for the use of more than one profile, a profile selector 408 may be used to retrieve one or more context values corresponding to a selected profile from a profile database 410. The retrieved context values may then be transmitted to a context value buffer 412. Context values are matched with one or more characteristics of the message in a context matcher function 414. Context matcher function 414 produces a ranked ordering of messages based on the one or more context values and uses the ranked ordering to drive an icon generator 416. For example, in one embodiment, artificial neural networks could be used to produce the ranked ordering of messages. The artificial neural network allows the context matcher function to have a learning capability of the user's preferences. Icon generator 416 retrieves one or more icons from icon storage area 418 (if not included in a message) and, based on the ranking information and the user's preferences, presents one or more auditory icons in the manner described above on speaker 423. In addition, icon generator 416 generates a display that includes a priority navigation bar in the manner described above on display 422.

If at least one of the context values chosen by the user is proximity, a proximity ranker 420 may be used to produce an ordered list of messages, with the order determined by the proximities of the message sources.

The auditory icons forming the priority and proximity navigation bars may be transmitted to a speaker 423. Similarly, the visual icons forming the priority and proximity navigation bars are transmitted to a display 422. Context matcher 414 and proximity ranker 420 may also be configured to identify messages that have predetermined characteristics. For example, the context matcher may be programmed to particularly identify any message received from a certain hardware store. A visual icon associated with the message may be placed in a predetermined location of display 622 to identify the significance of the message.

A user input device 426 can be used to modify the selection of profiles and context values stored profile database 410. User input device 426 may be implemented with a keypad, cursor, stylus, or similar input device. An optional icon selector function 428, for example a magnifying glass selector, allows the user to move over visual icons on the display to depict further information regarding the visual icons, to present the corresponding auditory icon, and/or to temporarily enlarge visual icons of potential interest. Other visual icon selectors can of course be used without departing from the inventive principles. Application launcher 430 launches an application associated with the selected icon in response to further user input. For example, application launcher 430 may start a Web browsing application if the particular icon has an associated hyperlink. Alternatively, if an icon represents a document, application launcher 430 can launch a document viewer or editor program.

Of course, other mobile terminals 432 may also transmit messages to mobile terminal 400. In one embodiment, the user of mobile terminal 400 may assign context values so that messages received from other known users (e.g., friends or family members) receive prioritized treatment in presenting associated auditory and visual icons.

Figure 5:
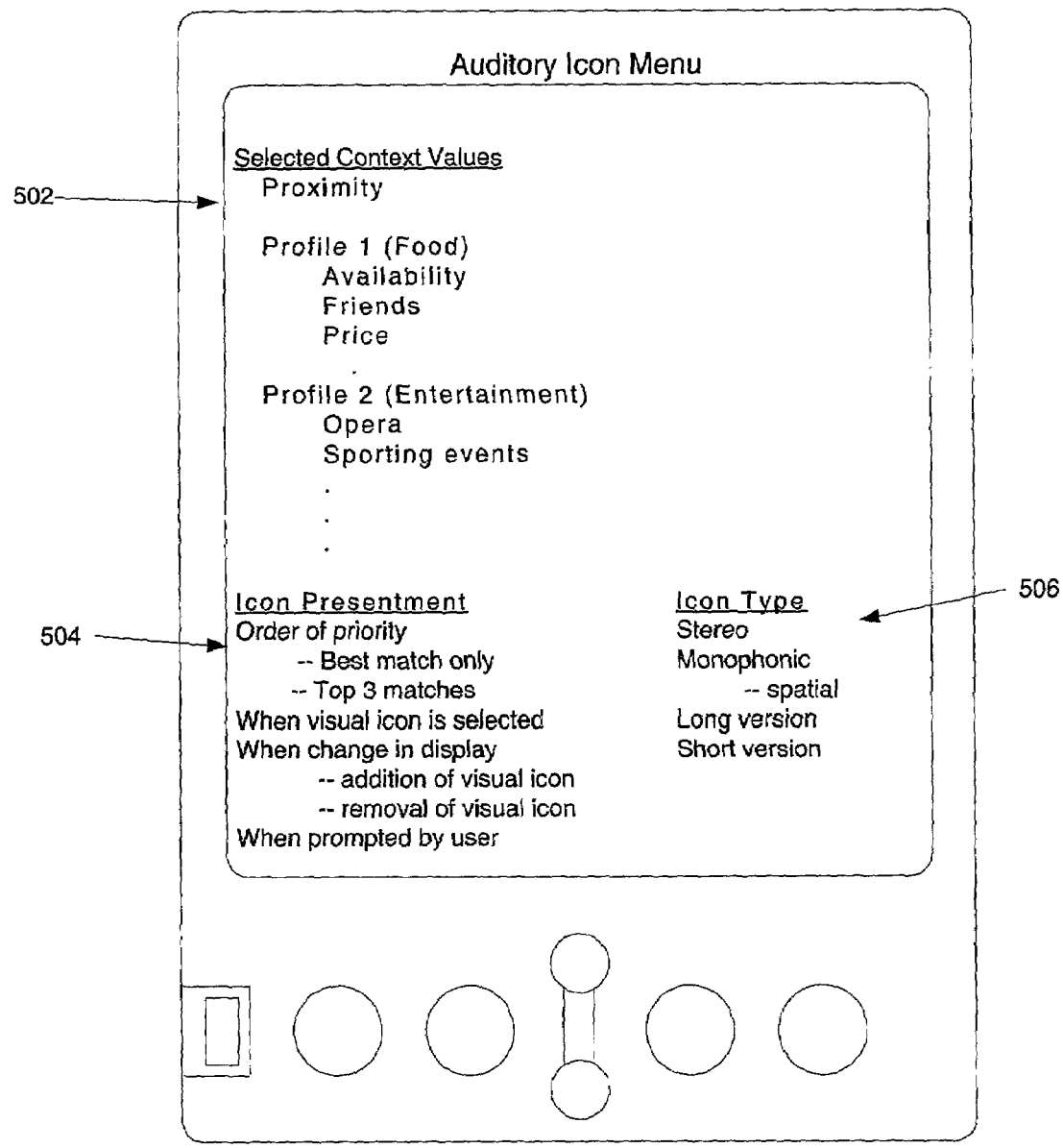
FIG. 5 illustrates a graphical user interface that allows a user of the mobile terminal to customize the presentment of auditory icons in accordance with an embodiment of the invention.
Figure 6:
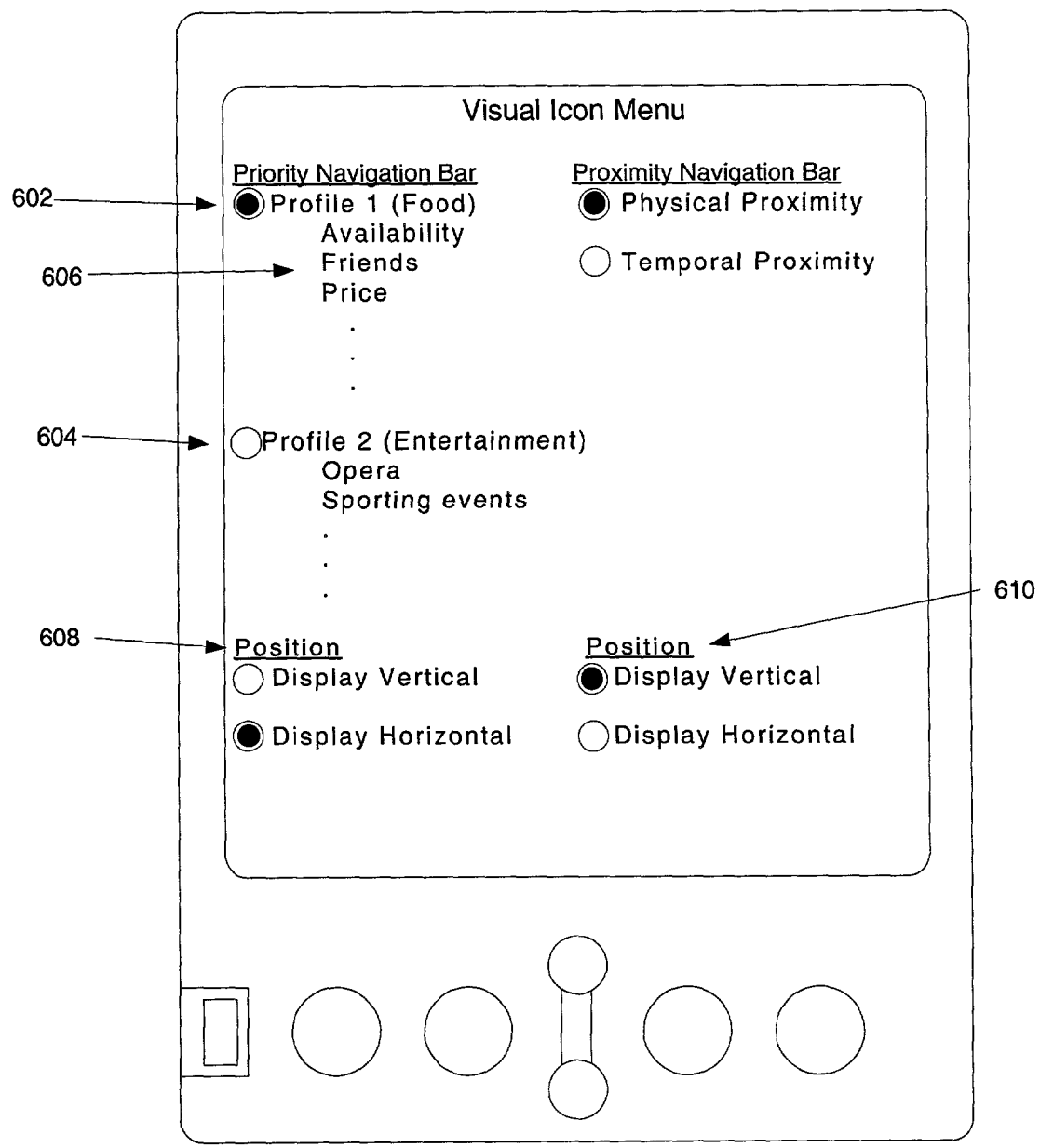
FIG. 6 illustrates a graphical user interface that allows a user of the mobile terminal to customize the display of visual icons in accordance with an embodiment of the invention.

As previously mentioned and although not required, the user may establish his/her preferences on the various options for presenting auditory or visual icons including how and under what circumstances they are presented or displayed as well as the context values that could be used to prioritize the auditory or visual icons. FIG. 5 depicts an example of a graphical user interface (GUI) that allows a user to configure his/her preferences for the presentment of auditory icons. This GUI provides the user a mechanism for selecting which auditory icons to receive, when, how, and in what format. As illustrated in FIG. 6, the display of visual icons may also be configured according to user preference by use of a GUI in a manner similar to that described herein.

Referring to FIG. 5, profile 502 allows the user to identify the context values that are of importance to the user. The user may also have the option of ranking the context values. The ranking of context values is presented in further detail herein. Profile 504 allows the user to select how the auditory icons should be presented. For example, for any set of context values, the user may determine whether to have the corresponding icons presented in increasing order, decreasing order, or just the best X number of matches. As another example, the user may determine when the auditory icons should be presented, for example, continuously, periodically, or when there is a change in the display of visual icons in the priority or proximity bars. As yet another example, the user may configure the mobile terminal to present auditory icons either manually or automatically. If the user chooses the manual option, some of the other presentment options may become inactive. Profile 506 allows the user to select the format of how the auditory icon is presented. For example, the auditory icon may be presented in stereo or mono mode (discussed further herein).

Those skilled in the art will appreciate that any number of GUIs may be implemented to configure the user's preferences for the presentment of auditory or visual icons. For example, the mobile terminal manufacturer, may choose to vary the level of customization to provide to the user. As illustrated herein, auditory and visual icons may be presented to the user in any number of ways; the various ways disclosed herein are merely illustrative and not limiting except as provided in the claims below.

FIG. 7 shows an example of a priority-ordered list of context values contained in a first user's profile. User A has selected proximity of service as the top priority, thus indicating that services having the closest proximity to the mobile unit (e.g., within a half-mile) should be ranked the highest, and corresponding icons should be presented first or displayed the most prominently on the display. The second priority relates to type of establishment, wherein the user may have selected one or more establishment types (e.g., food, retail, movies, and transportation). Services that best match these values will be ranked priority 2. Similarly, the user has indicated that availability of services (e.g., vacancy at a hotel or lack of crowds or waiting time at a restaurant) should receive priority level 3. Priority 4 has been specified for friends of the mobile terminal user; priority 5 has been specified for price of services; and priority 6 has been specified for grade of service (e.g., four-star hotels).

FIG. 8 shows an example of a priority-ordered list of context values contained in a second user's profile. In contrast to the profile shown in FIG. 7, User B has indicated that friends should be given the highest priority, even if they are not in close proximity to the user's mobile terminal. For example, if a friend of the user transmits e-mail messages to the user, an icon corresponding to that friend's messages could be presented first or featured most prominently on the display, even if the friend were not in the same geographic area. Also as seen in FIG. 8, User B has specified that price should take precedence over proximity. Consequently, User B would prefer to see icons for hotels that are lower in price even if such hotels are not in the closest proximity to the mobile terminal. Because no other context values were specified by User B, remaining messages having characteristics not represented in the table would be given equal treatment.

FIG. 9 shows an example of a priority-ordered list of context values contained in a third user's profile. As can be seen in FIG. 9, User C has specified a top priority for food establishments during a specified time period (e.g., 11 am to 1 pm). Consequently, during that time period, icons corresponding to food establishments will be presented first or displayed in the largest format. User C has specified the next priority level for proximity, and thus establishments having a specified or relative proximity to User C's mobile terminal will be presented next or represented in a next largest display format. User C has specified another time-based context value again for food during the hours of 6 pm to 8 pm. Consequently, during that time period, proximity will take precedence over food establishments, but food establishments will take precedence over price (as indicated at priority level 4). Many different variations on the above-described scheme can be used without departing from the inventive principles.

FIG. 10 shows a data storage area containing a plurality of records ranked first according to proximity and secondarily according to price. Although many different approaches for ranking and storing records are possible, according to the variation shown in FIG. 10, each record is assigned a ranking based on user-specified context values (in this case, proximity and price). As shown in FIG. 10, a number of different entities or services have transmitted messages to the mobile terminal. Each message includes information such as proximity to the mobile terminal (or geographic location, from which proximity can be derived) and price information (except in the case of the shoe store and Sears, both of which sell many differently priced items, and the Yahoo.com Web site, for which price is not particularly relevant).

According to FIG. 10, the records are ranked based on matching first on the proximity values and second on the price values. For example, the first three entries (corresponding to McDonald's, Pizza Hut, and Starbucks) all are located the same distance (0.1 kilometer or mile) from the mobile terminal, and thus are ranked as the first three records in the table. However, because McDonald's offers a lower average cost per meal ($3 compared to $5 for Pizza Hut and Starbucks), McDonald's is listed as the first of the three records. Similar relationships hold true for the remaining records in the table. Consequently, in one variation of the invention, the records in the table of FIG. 10 are used to display corresponding icons having sizes that decrease according to the order in which the records appear in the table.

Figure 11:
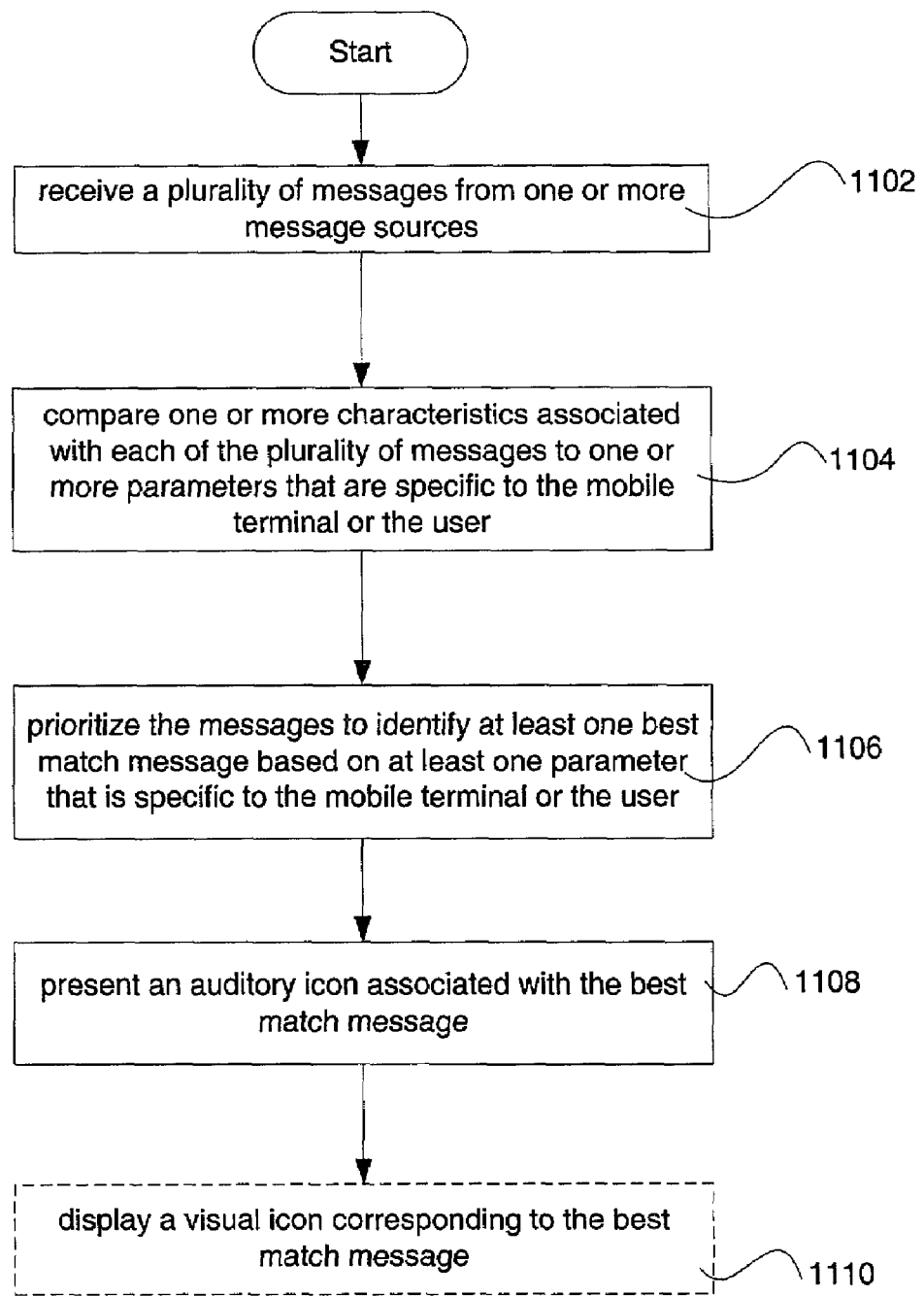
FIG. 11 is a flow chart illustrating the overall process for presenting auditory and visual icons in accordance with an embodiment of the invention.

As discussed, depending on the particular configuration desired by the user, auditory icons may be presented in any number of circumstances. FIG. 11 illustrates one example where the user desires to receive auditory icons corresponding to the best match message. First, in step 1102, the mobile terminal receives a plurality of messages from one or more message sources, similar to that discussed above with respect to FIG. 2. In step 1104, the mobile terminal compares one or more characteristics associated with each of the plurality of messages to one or more context values selected by the user. For example, the context value may be a proximity of the message source.

In step 1106, the mobile terminal prioritizes the messages to identify at least one best match message based on the user's selected context values. As illustrated above, the prioritizing is performed by comparing a characteristic associated with each of the plurality of messages to the context value.

In step 1108, the mobile terminal presents the auditory icon as configured by the user associated with the best match message. Optionally, in step 1110, the mobile terminal displays a visual icon corresponding to the best match message.

Figure 12:
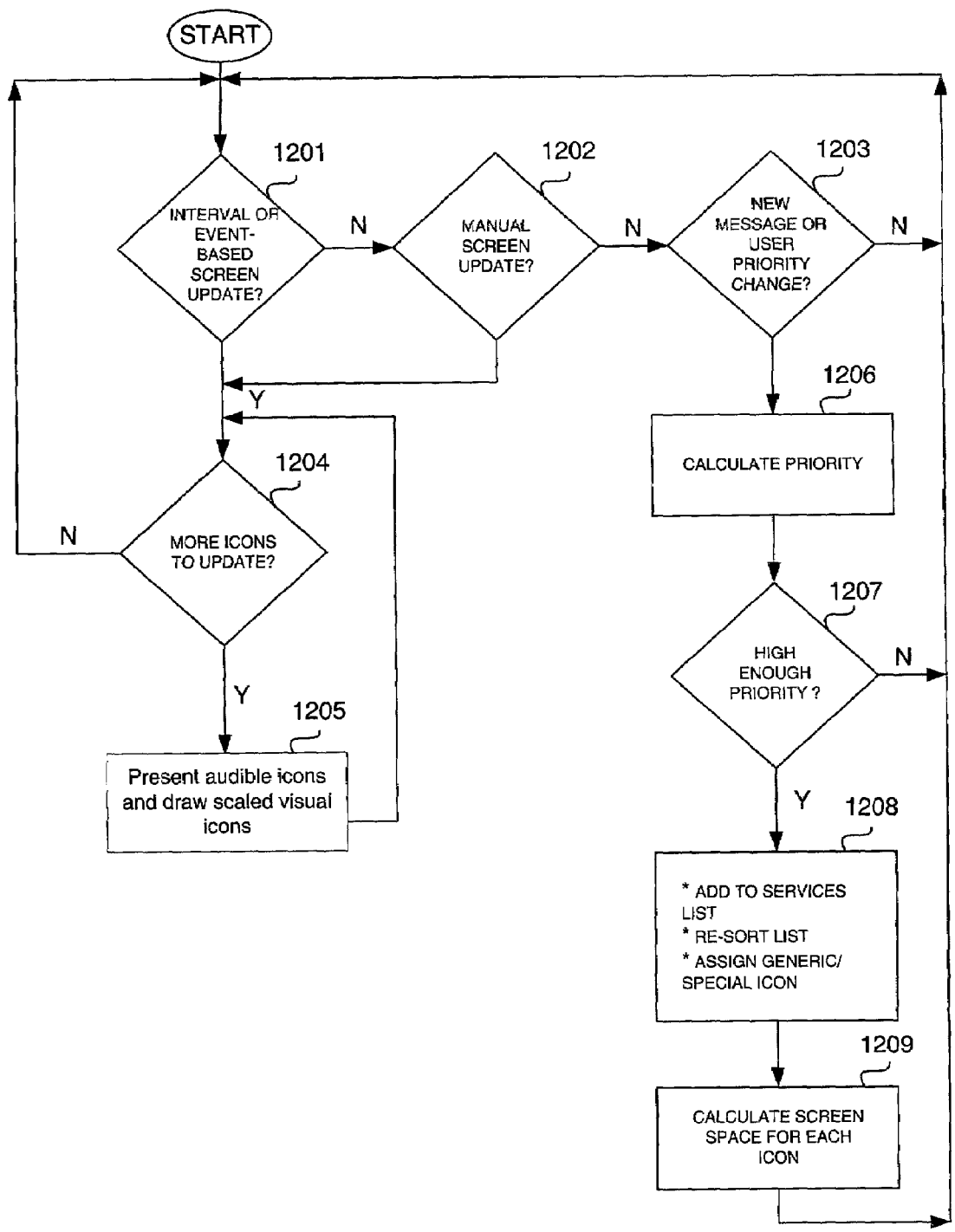
FIG. 12 is another flowchart illustrating steps that can be performed to practice one or more methods according to the invention.

FIG. 12 is a more detailed flowchart illustrating steps that can be performed to practice one or more methods according to the invention. In step 1201, a check is made to determine whether an interval has expired or an event-based screen update is required. If not, then in step 1202 a check is made to determine whether the user has manually updated the screen (e.g., moved objects on the display). If not, then in step 1203, a check is made to determine whether a new message has been received or whether the user has changed a priority setting for a context value. If not, processing repeats back to step 1201.

If in step 1201 an interval has expired or an event-based screen update is required, then in steps 1204 to 1205 a loop is executed to present one or more audible icons according to the user's preferences and to update the visual icons on the display, wherein each visual icon is scaled and displayed. When there are no more visual icons to update, processing resumes in step 1201.

If in step 1202 a manual screen update occurred, then steps 1204 and 1205 are performed as outlined above.

If in step 1203 a new message was received or the user changed a priority setting, then in step 1206 the priority or ranking of the new message is calculated (if a new message was received) based on a context value and/or the user's profile. For example, as explained below, if a message is received from a hotel that is near to the mobile terminal, and the user's profile indicates that proximity to a service should receive the highest priority, then a high priority is assigned to the new message. (Alternatively, proximity can be calculated on a relative basis, such that each entity is assigned a proximity indicator corresponding to a distance from the mobile terminal). Step 1206 may also include steps of extracting information from the message and storing it into message storage 406 (e.g., price information and the like). If the user changed a priority setting (e.g., changed the importance of proximity to be lower than the importance of price), then the new priorities of previously stored messages in profile database 410 are re-calculated.

In step 1207, if the priority is not high enough compared to the user's profile, then processing resumes in step 1201. Otherwise, if the priority is high enough, then step 1208 is executed. In step 1208, the service corresponding to the message is added to a services list; the list is re-sorted according to the current priority values; and each message is assigned to either a generic icon (if no entity-supplied icon is available, for instance a generic hotel icon) or a special icon (e.g., a corporate slogan icon or logo icon received from a hotel establishment). In step 1209, the screen space for each icon is calculated, such that the icons can be displayed in the allocated display space. Various techniques for sizing the visual icons are possible; in one example, visual icon widths can be scaled by an amount proportional to their rankings in a table of sorted visual icons.

As discussed, there may be a need to avoid continuous disturbing playing of auditory icons by the mobile terminal. In this regard, the mobile terminal may be set with a certain threshold of requirements before any auditory icons are presented. For example, the user may desire auditory icons only when a specific restaurant is in a specific proximity. The auditory icon for the message corresponding to that restaurant may then be presented when the mobile terminal is within a certain distance.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I claim:

1. A method of providing an audio user interface for a mobile terminal comprising the steps of:
   (a) receiving a plurality of messages from at least one message source, each message associated with at least one corresponding auditory icon, each message further associated with at least one corresponding visual icon;
   (b) prioritizing the plurality of messages to identify at least one message based on at least one context value;
   (c) presenting the auditory icon associated with the identified message; and
   (d) representing, in a display of the mobile terminal, the visual icon corresponding to the identified message.

2. The method of claim 1, wherein step (d) comprises the step of displaying the visual icon using a display format that is enlarged in relation to other icons in the display.

3. The method of claim 1, wherein step (b) comprises the step of comparing at least one characteristic associated with each of the plurality of messages to at least one context value.

4. The method of claim 1, wherein step (b) comprises the step of using an artificial neural network to prioritize the plurality of messages.

5. The method of claim 1, wherein step (c) comprises the step of presenting a spatial position to the user.

6. The method of claim 1, wherein step (c) comprises the step of presenting a spatial position to the user by stereo amplitude panning.

7. The method of claim 1, wherein step (c) comprises the step of presenting a spatial position to the user by acoustic modeling and auralization techniques.

8. The method of claim 1, wherein step (c) comprises the step of presenting the auditory icon in stereophonic mode.

9. The method of claim 1, wherein step (c) comprises the step of presenting the auditory icon in monophonic mode.

10. The method of claim 1, wherein step (c) comprises the step of using text-to-speech (TTS) synthesis to present the auditory icon.

11. The method of claim 1, wherein step (c) comprises the step of streaming additional descriptive audio information about the message.

12. The method of claim 1, wherein step (b) comprises the step of ordering each received message in order of matching to the context value and step (c) comprises the step of presenting the auditory icon for each received message in accordance with the order determined in step (b).

13. The method of claim 1, wherein step (a) comprises the step of receiving the corresponding auditory icon for each received message.

14. The method of claim 1, wherein step (c) comprises the step of identifying the corresponding auditory icon with each received message.

15. A method of providing an audio user interface for a mobile terminal comprising the steps of:
 (a) receiving a plurality of messages from at least one message source, each message associated with at least one corresponding auditory icon, wherein each message is further associated with at least one corresponding visual icon;
 (b) identifying at least one best match message based on at least one context value;
 (c) presenting the auditory icon associated with the identified message; and
 (d) representing, in a display of the mobile terminal, the visual icon corresponding to the identified message.

16. A computer-readable medium having computer-executable instructions for performing the steps of:
 (a) prioritizing a plurality of received messages to identify at least one message based on at least one context value, the message being associated with an auditory icon and a visual icon;
 (b) presenting the auditory icon associated with the identified message; and
 (c) representing, in a display of a mobile terminal, the visual icon associated with the identified message.

17. A method of providing a plurality of icons on a mobile terminal comprising the steps of:
 (a) receiving a plurality of messages from at least one external message source, each message associated with at least one associated auditory icon and at least one associated visual icon;
 (b) prioritizing the plurality of messages in order of match to at least one context value;
 (c) representing, in a display of the mobile terminal, the visual icons associated with the messages using a display format that visually prioritizes the visual icons according to match with the context value; and
 (d) presenting at least one auditory icon associated with one of the represented visual icons.

18. The method of claim 17, wherein step (c) comprises the step of representing the visual icons in at least one navigation bar.

19. The method of claim 17, further comprising the steps of: presenting an auditory icon corresponding to each represented visual icon.

20. The method of claim 17, further comprising the steps of:
 (e) performing steps (a) and (b) at a subsequent point in time;
 (f) updating the represented visual icons by representing at least one additional visual icon; and
 (g) presenting an auditory icon corresponding to the additional visual icon.

21. The method of claim 17, further comprising the steps of:
 (e) performing steps (a) and (b) at a subsequent point in time;
 (f) updating the represented visual icons by removing one of the represented visual icons; and
 (g) presenting an auditory icon corresponding to the removed visual icon.

22. The method of claim 17, wherein step (d) comprises the step receiving an indication from a user that one of the represented visual icons has been selected and presenting the auditory icon associated with the selected visual icon.

23. The method of claim 17, wherein step (d) comprises the step of presenting a spatial position to the user.

24. The method of claim 17, wherein step (d) comprises the step of presenting a spatial position to the user by stereo amplitude panning.

25. The method of claim 17, wherein step (d) comprises the step of presenting a spatial position to the user by acoustic modeling and auralization techniques.

26. The method of claim 17, wherein step (d) comprises the step of presenting the auditory icon in stereophonic mode.

27. The method of claim 17, wherein the at least one auditory icon and the at least one associated visual icon associated with each of the plurality of messages are included with each of the plurality of messages.

28. The method of claim 17, wherein step (d) comprises the step of using text-to-speech (TTS) synthesis to present the auditory icon.

29. The method of claim 17, wherein step (d) comprises the step of streaming additional descriptive audio information about the message.

30. The method of claim 17, wherein step (b) comprises the step of using an artificial neural network to prioritize the plurality of messages.

31. A mobile terminal comprising:
 (a) a display capable of displaying visual icons, each visual icon having an associated auditory icon;
 (b) a user input device that permits a user of the mobile terminal to select at least one of the visual icons displayed on the display; and
 (c) an auditory user interface for presenting the associated auditory icon when the visual icon has been selected; and
 (d) a processor programmed with computer-executable instructions that, when executed, perform the steps comprising:
  (i) prioritizing a plurality of messages based on at least one context value; and
  (ii) displaying visual icons associated with each of the messages in order of priority as determined by the prioritizing step.

32. The mobile terminal of claim 31, wherein the prioritizing step comprises the step of comparing at least one characteristic associated with each of a plurality of messages to one or more context values that are specific to a user of the mobile terminal.

33. The mobile terminal of claim 32, wherein the displaying step comprises the step of displaying visual icons by relative size such that relative size is proportional to priority.

34. The mobile terminal of claim 32, wherein the displaying step comprises the step of displaying visual icons consecutively in order of priority.

35. The mobile terminal of claim 31, wherein the prioritizing step comprises the step of determining a proximity value associated with each message in relation to the mobile terminal.

36. The mobile terminal of claim 35, wherein the displaying step comprises the step of displaying visual icons by relative size such that relative size is proportional to proximity value.

37. The mobile terminal of claim 35, wherein the displaying step comprises the step of displaying visual icons consecutively in order of proximity value.

38. A mobile device comprising in combination:
 (a) a display comprising a plurality of user-selectable icons arranged in an order determined by a degree of matching between information corresponding to respective ones of the first plurality of visual icons and at least one context value; and (b) a sound generator providing an audio icon associated with the plurality of user-selectable visual icons, wherein the sound generator provides the audio icons associated with each of the plurality of user-selectable visual icons in order of priority.

39. The mobile device of claim 38, wherein the plurality of user-selectable icons comprises a set of user-selectable icons arranged in a navigation bar.

40. The mobile device of claim 39, wherein at least one of the visual icons in the set is displayed in an enlarged format relative to others of the first set of icons.

41. The mobile device of claim 38, wherein the sound generator provides the audio icon in response to a user selecting one of the plurality of user-selectable visual icons.

42. A mobile terminal comprising:
(a) a display capable of displaying visual icons, each visual icon having an associated auditory icon;
(b) a means for allowing a user to provide a context for use in determining priority of the visual icons;
(c) a means for displaying visual icons so as to vary the size of the icon in relationship to the priority of the visual icon;
(d) a user input device that permits a user of the mobile terminal to select at least one of the visual icons displayed on the display; and
(e) means for presenting the associated auditory icon when the visual icon has been selected.

* * * * *